United States Patent
Kim (10) Patent No.: US 8,035,833 B2
(45) Date of Patent: Oct. 11, 2011

(54) FACSIMILE COMMUNICATION INTERFACE UNIT CAPABLE OF PREVENTING DATA ERROR CAUSED BY NOISE BY USING A TRANSFORMER AND THE TRANSFORMER THEREOF

(75) Inventor: Eog-kyu Kim, Suwon-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 1333 days.

(21) Appl. No.: 11/239,229

(22) Filed: Sep. 30, 2005

(65) Prior Publication Data
US 2006/0072153 A1    Apr. 6, 2006

(30) Foreign Application Priority Data
Oct. 1, 2004    (KR) .................. 10-2004-0078363

(51) Int. Cl.
- G06F 3/12    (2006.01)
- H04M 11/00   (2006.01)
- H01F 27/02   (2006.01)
- H01F 27/28   (2006.01)
- H04N 1/32    (2006.01)

(52) U.S. Cl. .................. 358/1.15; 379/100.05; 336/90; 336/182; 336/229; 358/442

(58) Field of Classification Search ........... 358/442, 358/1.15; 379/100.05; 336/90, 145, 182, 336/229
See application file for complete search history.

(56) References Cited

U.S. PATENT DOCUMENTS

| | | | |
|---|---|---|---|
| 3,940,959 A | * | 3/1976 | Anderson et al. .......... 70/259 |
| 4,133,363 A | * | 1/1979 | Gardner .................. 157/1.3 |
| 4,267,404 A | * | 5/1981 | Rohde ..................... 178/46 |
| 5,086,453 A | * | 2/1992 | Senoo et al. ............ 379/93.09 |
| 5,655,009 A | * | 8/1997 | Arai et al. .............. 379/93.28 |
| 5,751,442 A | * | 5/1998 | Hamada et al. ............ 358/442 |

(Continued)

FOREIGN PATENT DOCUMENTS
JP    08-017659    1/1996
(Continued)

OTHER PUBLICATIONS

Official Action issued by the Korean Intellectual Property Office concerning Korean Patent Application No. 2004-78363, dated Oct. 1, 2004 (2 pages).

*Primary Examiner* — Sudhanshu C Pathak
*Assistant Examiner* — Mesfin Getaneh
(74) *Attorney, Agent, or Firm* — Staas & Halsey LLP (57) ABSTRACT

A communication interface unit of a facsimile and a transformer for preventing a power source noise. The communication interface unit includes the transformer between a line unit and a MODEM for electrically separating the circuit boards of the line unit and the MODEM for preventing the power source noise causing data transmission error from flowing into the line unit. Also, a method for bonding the ferrite core and the housing in order to prevent damage to the transformer caused by an external force and minimizing generation of capacitance component by bonding. The bonding method can be more effectively implemented when an integrated circuit type data access arrangement circuit is used for accessing the PSTN. The present invention can prevent distortion of data generated by power source noise such as EFT and also prevent the ferrite core slipping off from the housing.

16 Claims, 4 Drawing Sheets

U.S. PATENT DOCUMENTS

| | | | | |
|---|---|---|---|---|
| 5,850,431 | A * | 12/1998 | Satou | 379/93.09 |
| 5,974,123 | A * | 10/1999 | Nakayama et al. | 379/100.16 |
| 6,144,278 | A * | 11/2000 | Nishida et al. | 336/92 |
| 6,246,591 | B1 * | 6/2001 | Ikeda et al. | 361/827 |
| 6,320,489 | B1 * | 11/2001 | Lu et al. | 336/96 |
| 6,456,180 | B1 * | 9/2002 | Moore | 336/90 |
| 6,753,749 | B1 * | 6/2004 | Chin | 336/90 |
| 6,900,715 | B2 * | 5/2005 | Miettinen et al. | 336/65 |
| 7,007,182 | B1 * | 2/2006 | Tsumura | 713/324 |
| 2002/0100060 | A1 * | 7/2002 | Sugiura | 725/127 |
| 2003/0001709 | A1 * | 1/2003 | Visser | 336/200 |
| 2004/0041674 | A1 * | 3/2004 | Dixon | 336/90 |

FOREIGN PATENT DOCUMENTS

| | | |
|---|---|---|
| JP | 09-320857 | 12/1997 |
| KR | 1999-3246 | 1/1999 |
| KR | 20-273806 | 4/2002 |
| KR | 2003-94990 | 12/2003 |

* cited by examiner

FACSIMILE COMMUNICATION INTERFACE UNIT CAPABLE OF PREVENTING DATA ERROR CAUSED BY NOISE BY USING A TRANSFORMER AND THE TRANSFORMER THEREOF

CROSS-REFERENCE TO RELATED APPLICATIONS

This application claims the benefit of Korean Patent Application No. 2004-78363 filed Oct. 1, 2004, in the Korean Intellectual Property Office, the disclosure of which is incorporated herein by reference.

BACKGROUND OF THE INVENTION

1. Field of the Invention

The present invention relates to a transformer as a data transferring unit arranged between a main unit and a line unit in a facsimile in order to prevent power source noise generated at a power supplier to flow into the line unit and preventing noise entering from a public switched telephone network to the line unit, and a communication interface unit of a facsimile using the same.

2. Description of the Related Art

A facsimile is a device for transmitting a document to other facsimile connected through a public switched telephone network (PSTN). The facsimile scans the document to generate image data of the document and transfers the image data to other facsimile. Also, the facsimile receives the image data from other facsimile and prints the image data on a plain paper.

Generally, the facsimile is connected to the PSTN and transmits the image data by telephoning the other facsimile.

Figure 1:
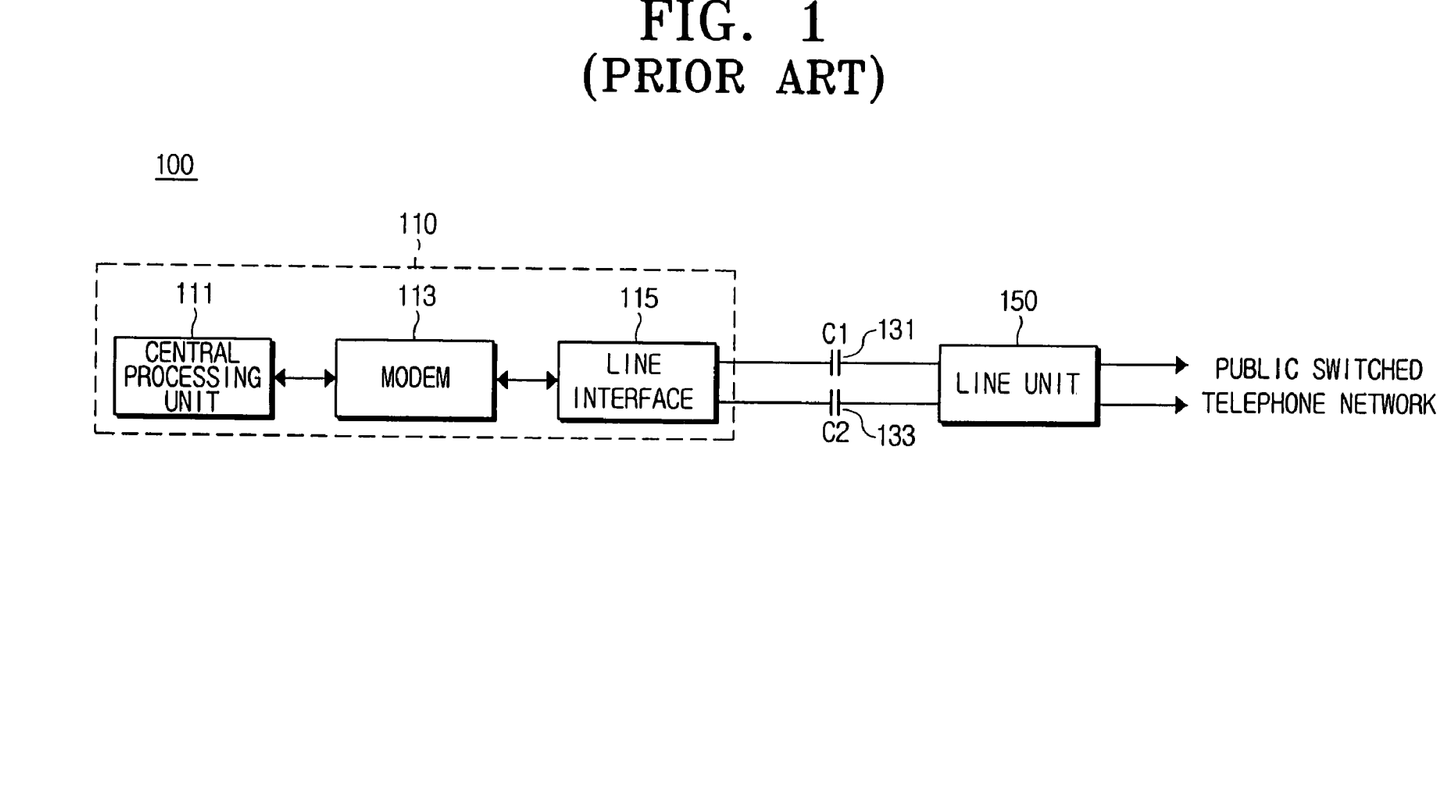
FIG. 1 is a block diagram illustrating a conventional facsimile.

FIG. 1 is a block diagram illustrating a conventional facsimile.

By referring to FIG. 1, the conventional facsimile 100 includes a main unit 110, a first condenser C1 131, a second condenser C2 133 and a line unit 150.

The main unit 110 controls general operations of the facsimile 100 for scanning a document to generate image data and processing the image data to be transmitted to other facsimile (not shown). The main unit 100 includes a central processing unit 111, a MODEM 113 and a line interface 115.

The central processing unit 111 generates image data by scanning the document and transfers the image data to the line unit 150 through the MODEM 113 and the line interface 115.

The line unit 150 is directly connected to the PSTN where the facsimile is connected. The line unit 150 transmits the image data by telephoning to other facsimile and receives the image data from other facsimile by accepting an incoming call from the other facsimile.

The line unit 150 includes a data access arrangement (DAA) block (not shown). The DAA block receives digital data of the image data from the main unit 110 and converts the received digital data to analog data. Also, the DAA block transmits the analog data to other facsimile by telephoning the other facsimile. Recently, an integrated circuit is commonly used as the DAA block. Hereinafter, the DAA block is called a silicon DAA.

Meanwhile, a reference electric potential of the main unit 110 and a reference electric potential of the line unit 150 should be different. Therefore, the main unit 110 and the line unit 150 are implemented to have separated circuit boards or to separate a ground from the circuit board. By using separated circuit boards or separating the ground from the circuit board, it protects the facsimile 100 and a user of the facsimile 100 from a high voltage noise flowing into the main unit 110 when the high voltage noise enters from the PSTN to the line unit 150.

Therefore, the main unit 110 and the line unit 150 are designed to be separated and they are connected by the first condenser C1 131 and the second condenser C2 133. Also, the first condenser C1 131 and the second condenser C2 133 eliminate low frequency noise transferred from the line unit 150.

However, when a noise such as an electrical fast transient EFT is applied to an electric power supplied to the main unit 110, the noise is transferred to the line unit 150 through the first condenser C1 131 and the second condenser C2 133. Thus, the image data may be distorted by the noise. The distortion of image data becomes more serious when the silicon DAA is used.

SUMMARY OF THE INVENTION

Additional aspects and/or advantages of the invention will be set forth in part in the description which follows and, in part, will be apparent from the description, or may be learned by practice of the invention.

An aspect of the present invention is to provide a transformer for cutting off a power source noise, and a communication interface unit of a facsimile including the transformer instead of a condenser as a data transferring unit for cutting off the power source noise and effectively transmitting data.

In accordance with an aspect of the present invention, there is provided a communication interface unit of a facsimile, including: a MODEM unit for modulating a data to be transmitted to an external device and demodulating data received from the external device; a line unit for communicating to the external device through a public switched telephone network by including an integrated circuit transmitting the modulated data and receiving the data from the external device for demodulation by accessing the public switched telephone network; and a transformer arranged between the MODEM unit and the line unit for transferring the received data from the line unit to the MODEM unit and transferring the modulated data from the MODEM unit to the line unit.

The transformer may include: a ferrite core having a ring shape; first and second lead wires wound around a circumference of the ferrite core in a solenoid shape; and a housing having a ferrite core housing unit for housing the ferrite core.

The transformer may further include a bonding member for preventing the ferrite core from slipping off of the ferrite core housing unit.

The bonding member may be a resin having an adhesive property for bonding the ferrite core to the housing by being applied to a predetermined area of circumference of the ferrite core and a predetermined area of an inner surface of housing.

The bonding member may be at least one lip extended from a predetermined location of the housing for preventing the ferrite core from slipping off of the housing.

The bonding member may be a protrusion penetrating a center of the ferrite core having one end fixed to the housing and another end having a lip.

In accordance with another aspect of the present invention, there is provided a facsimile using a communication interface unit having a transformer preventing a power source noise for preventing data noise caused by the power source noise.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
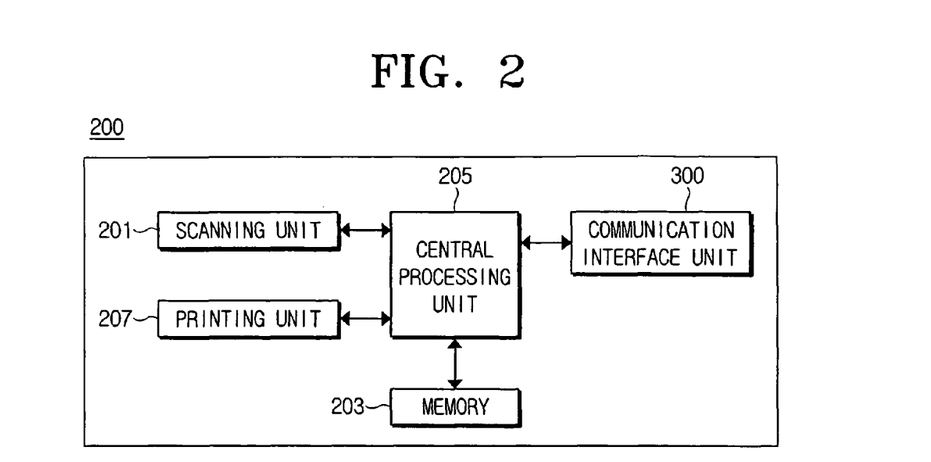
FIG. 2 is a diagram showing a facsimile having a communication interface unit in accordance with a preferred embodiment of the present invention.

FIG. 2 is a diagram showing a facsimile having a communication interface unit in accordance with an embodiment of the present invention.

A communication interface unit of the present invention is included in a facsimile 200 connected to a public switched telephone network (PSTN) where facsimiles and multifunctional devices are connected. Furthermore, the communication interface unit of the present invention can be included in a device using a silicon DAA.

As shown in FIG. 2, the facsimile 200 includes a communication interface unit 300, a scanning unit 201, a memory 203, a central processing unit 205 and a printing unit 207.

The facsimile 200 is connected to an external device (not shown) through a public switched telephone network (PSTN), generates image data by scanning a document, transmits the image data to the external device (not shown), and receives the image data from the external device.

When a document to be transmitted to the external device (not shown) is inserted into the facsimile 200, the inserted document is scanned to generate a digital image data and the digital image data is stored in the memory 203.

The printing unit 207 prints an image corresponding to image data received from the central processing unit 205 on a plain paper. That is, the printing unit 207 prints the image data received from the external device.

The central processing unit 205 controls general processes of the facsimile 200 including a process of forming an image according to the image data. And the central processing unit 205 also converts the image data to a target form to be printable at the printing unit 207 and transfers the target form of the image data to the printing unit 207.

Also, the central processing unit 205 transmits the data through the communication interface unit 300 for transmitting data to the external device and receiving data from the external device.

The communication interface unit 300 modulates data transferred from the central processing unit 205, telephones to other facsimile and transmits the modulated data to the other facsimile. Also, the communication interface unit 300 receives data from the external device and demodulates the received data and transfers it to the central processing unit 205.

Hereinafter, the communication interface unit 300 is explained in detail by referring to FIG. 3.

Figure 3:
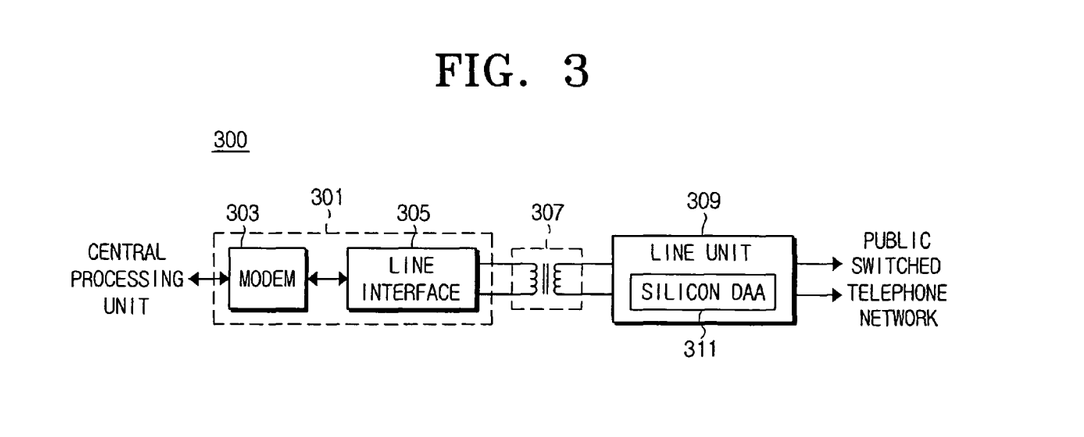
FIG. 3 is a detailed diagram showing the communication interface unit 300 in FIG. 2 in accordance with an embodiment of the present invention.

FIG. 3 is a detailed diagram showing the communication interface unit 300 in FIG. 2 in accordance with an embodiment of the present invention.

As shown in FIG. 3, the communication interface unit 300 includes a MODEM unit 301, a transformer 307 and a line unit 309.

The MODEM unit 301 includes a MODEM 303 and a line interface 305.

The MODEM unit 301 modulates data to be transmitted to an external device (not shown) and outputs the modulated data. Also, the MODEM unit 301 demodulates data received from the external device (not shown) and transfers the demodulated data to the central processing unit 205. The MODEM unit 301 includes the line interface 305 for interfacing with the line unit 309.

The MODEM 303 is a device for modulating and demodulating data in order to communicate with the external device (not shown). The MODEM 303 corresponds to a MODEM (not shown) included in the external device.

The line interface 305 converts data outputted from the MODEM 303 to digital data before transferring the data to the line unit 309 for data-transmitting. Also, the line interface 305 converts data output from the line unit 309 to analog data for data-receiving.

The line unit 309 is a device for accessing the external device (not shown) by telephoning to the external device or receiving an incoming call from the external device. The line unit 309 includes a silicon data access arrangement (DAA) 311.

The silicon DAA 311 converts data transferred from the transformer 307 to analog data and performs operations for accessing the PSTN for telephoning to the external device (not shown).

Also, the silicon DAA 311 is an integrated circuit (IC) that receives the incoming call from the external device, converts the received data to digital data and transfers the digital data to the line interface 305 through the transformer 307.

The transformer 307 electrically separates the line interface 305 and the line unit 309, and transfers the signal of the line interface 305 to the line unit 309.

As described above, a reference electric potential of the line interface 305 and a reference electric potential of the MODEM 303 should be different. Therefore, the line interface 305 and the MODEM 303 have separated circuit boards to have different reference electric potential or the ground is separated from the circuit board for having different reference electric potential. Accordingly, a high voltage noise entered from the PSTN to the line unit 309 is cut off from following to the inside of the facsimile 200, and thus the facsimile 200 and the user are protected.

In the present invention, the line interface 305 and the line unit 309 are separated by using different circuit boards and they are connected by using the transformer 307.

As mentioned above, when a noise generated by a power supplier (not shown) of the facsimile 200 is transferred to the line unit 309, the image data may be distorted. The noise generated by the power supply is commonly called power source noise. Particularly, the problem of the power source noise becomes more serious when an integrated circuit IC such as the silicon DAA 311 is used. Therefore, the external device may receive distorted data.

In the present invention, the transformer 307 prevents the transfer of power source noise to the line unit 309. Accordingly, the transformer 307 also prevents distorted data from being transmitted to the external device (not shown).

Further, the transformer 307 also prevents the power source noise entering from the line unit 309 through the PSTN from being transferred to the line interface 305.

The transformer 307 includes a ferrite core, a first lead wire and a second lead wire wound around the ferrite core with a turn ratio of 1:1. The first lead wire is connected to the line unit 309 and the second lead wire is connected to the line interface 305.

Figure 4:
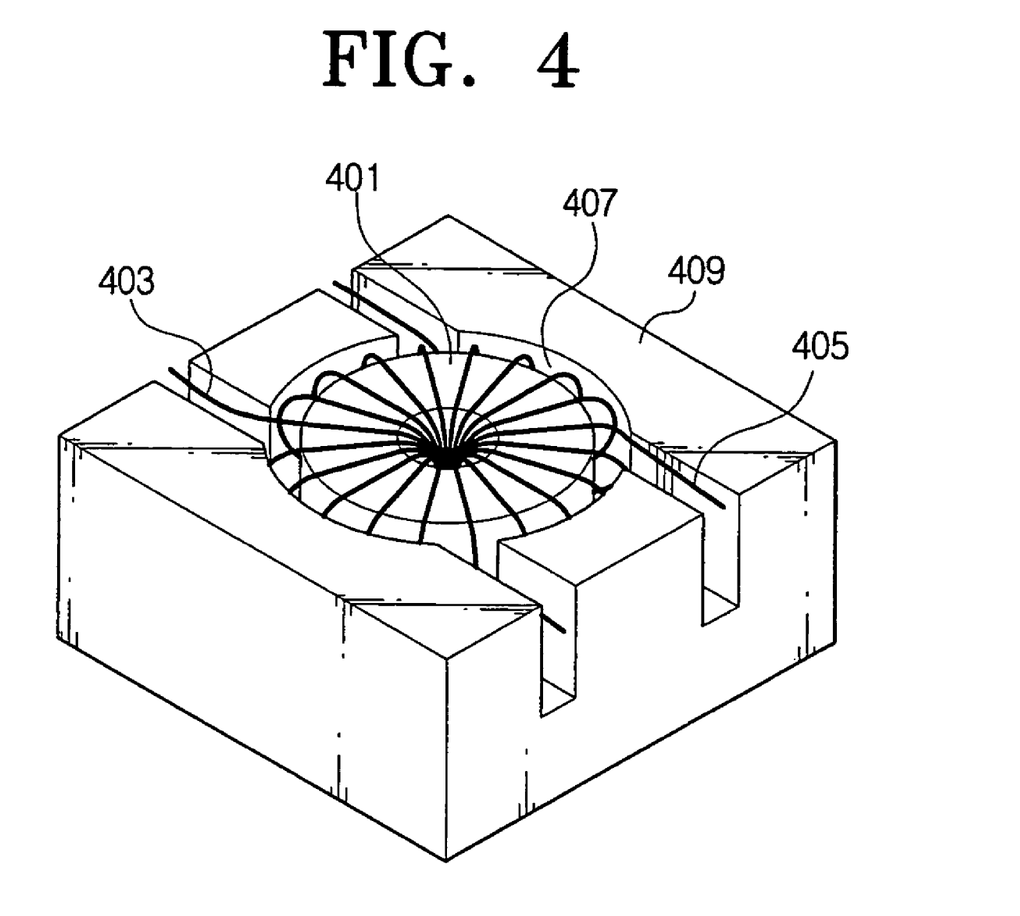
FIG. 4 is a perspective view of the transformer 307 included in the communication interface unit in FIG. 3 in accordance with an embodiment of the present invention.

FIG. 4 is a perspective view of the transformer 307 included in the communication interface unit in FIG. 3 in accordance with an embodiment of the present invention.

As shown in FIG. 4, the transformer 307 includes a ring shaped ferrite core 401, a first lead wire 403, a second lead wire 405, and a housing 409 having a ferrite core housing unit 407 for housing the ferrite core 401. The first lead wire 403 and the second lead wire 405 are wound to the ferrite core 401 in the form of a solenoid.

However, when the transformer 307 is vibrated by vibration generated by external force, the ferrite core 401 slips off from the ferrite core housing unit 407. If the ferrite core 401 slips off, the first and the second lead wires are cut off.

Accordingly, the ferrite core 401 of the transformer 307 should be fixed in the housing 409.

Figure 5:
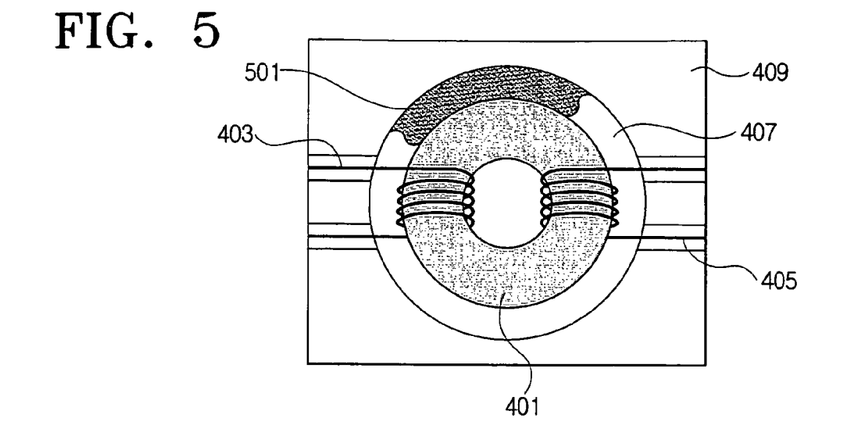
FIG. 5 is a diagram showing a transformer of a communication interface unit in accordance with another embodiment of the present invention.

FIG. 5 is a diagram showing a transformer of a communication interface unit in accordance with another embodiment of the present invention.

As shown in FIG. 5, the ferrite core 401 is fixed to the housing 409 by forming a bonding 501. That is, the ferrite core 401 is bonded to the housing 409 by using the bonding 501. The ferrite core 401 and the housing 409 may be bonded by using a resin having an adhesive property such as an epoxy resin.

If the epoxy resin is applied to entire curtain wall of the ferrite core 401 for bonding the ferrite core 401 and the housing 409, a capacitance component is generated between the first lead wire 403 and the second lead wire 405 because of structural characteristics formed by the first lead wire 403, the second lead wire 405 and the epoxy resin. Because of the generated capacitance components, the high voltage noise cannot be prevented from flowing into the line unit. Therefore, the ferrite core 401 and the housing 409 are bonded so as not to generate the capacitance component.

Therefore, in the present invention, the bonding 501 is formed in a predetermined internal area of the housing 409 and a predetermined area of the curtain wall of the ferrite core 401.

The size of the predetermined area of the bonding formed in the ferrite core 401 and the housing 409 is determined according to a size of the ferrite core housing unit 407, the size of the ferrite core 401, the thickness of the first and the second lead wires 403 and 405, and the state and the number of windings of the lead wires around the ferrite core 401. And, it must consider the allowable capacitance component for operating the communication interface unit 300 to determine the size of the predetermined area of the bonding.

Figure 6:
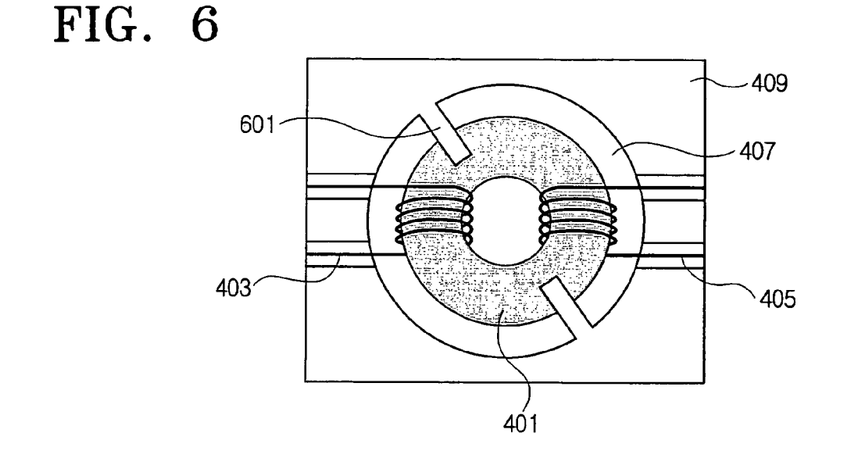
FIGS. 6 and 7 are diagrams showing a transformer of a communication unit in accordance with still another embodiment of the present invention.
Figure 7:
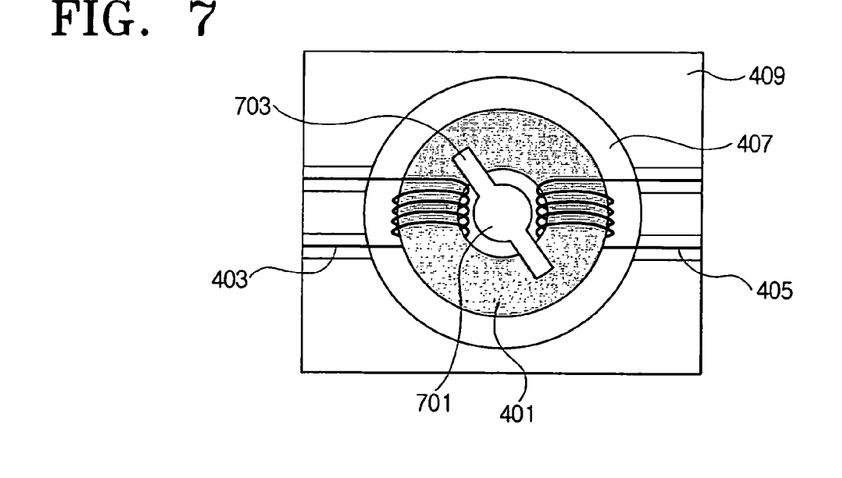

FIGS. 6 and 7 are diagrams showing a transformer of a communication interface unit in accordance with another embodiment of the present invention.

The ferrite core 401 is fixed by at least one of lip 601 extended from the housing 409 instead of using the bonding. As shown in FIG. 6, there are two lips 601 formed on predetermined locations of the housing 409 to be extended to an upper portion of the ferrite core housing unit 407. The lips prevent the ferrite core 401 from slipping off from the housing 409.

As shown in FIG. 7, the transformer 307 includes a ring shaped ferrite core 401, a first lead wire 403 and a second lead wire 405 being wound around the ferrite core 401 and a housing 409 having a ferrite core housing unit 407 for housing the ferrite core 401. The transformer 307 further includes a protrusion 701. The protrusion 701 penetrates the center of the ferrite core 401. A bottom end of the protrusion 701 is fixed to the inner surface of the housing 409 and has a lip 703 formed on an upper end of the protrusion 701 extended from the center of the protrusion 701 to the upper portion of the ferrite core 401 for preventing the ferrite core 701 from slipping off from the ferrite core housing 407.

As described above, FIGS. 5 to 7 show various methods for bonding the ferrite core 401 of the transformer 307.

In the present invention, the ferrite core 401 does not slip off from the transformer 307 when the communication interface unit 300 is vibrated by bonding the transformer 307 of the communication interface unit 300 into the housing 409. Therefore, it also prevents the first and the second lead wires 403 and 405 from being cut off when the ferrite core 401 slips off from the housing 409.

As shown in FIG. 5, the capacitance components are minimized by applying the epoxy resin in a predetermined portion of the ferrite core 401 and a predetermined portion of the housing 409 instead of applying the epoxy resin to entire internal surface of the housing and entire curtain wall of the ferrite core 401. Also, the generation of the capacitance components is eliminated by using the protrusion and lip as shown in FIGS. 6 and 7 in the present invention.

Accordingly, by using the above mentioned communication interface unit of the present invention, the power source noise and the data distortion of facsimile can be prevented.

As described above, the power source noise such as the electrical fast transient EFT that influences the silicon DAA and thus the image data to be transmitted becomes distorted by the power source noise. However, the present invention can prevent the data distortion by using the transformer as the data transferring unit between the main unit and the line unit.

Also, the present invention can prevent the ferrite core from slipping off from the housing by bonding the ferrite core and the housing. Furthermore, the capacitance components generated from the epoxy resin is minimized by using the protrusion and the lip for bonding the ferrite core and the housing. Therefore, the present invention can prevent damage of the transformer by external vibration and simultaneously prevent power source noise.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A communication interface unit of a facsimile, comprising:
   a MODEM unit to modulate data to be transmitted to an external device and demodulate data received from the external device;
   a line unit to communicate with the external device through a public switched telephone network including an integrated circuit transmitting the modulated data and receiving the data from the external device for demodulation by accessing the public switched telephone network; and a transformer arranged between the MODEM unit and the line unit to transfer the received data from the line unit to the MODEM unit and transferring the modulated data from the MODEM unit to the line unit,
wherein the transformer comprises
a ferrite core having a ring shape;
a housing to house the ferrite core; and
a bonding member to fix the ferrite core to the housing by bonding a part of a circumference of the ferrite core to the housing,
wherein the housing comprises a housing unit to house the ferrite core,
wherein the housing unit has a trench structure, and
wherein the trench structure houses the ferrite core,
wherein the size of a surface bonding between the ferrite core and the housing is decided according to an allowable capacitance component on the communication interface unit of the facsimile.

2. The communication interface unit of claim 1, wherein the transformer further comprises a first lead wire and a second lead wire wound around a circumference of the ferrite core in a solenoid shape, and
wherein the housing is configured in such a manner that the first and second lead wires are pulled out from the housing.

3. The communication interface unit of claim 1, wherein the bonding member further comprises a resin having an adhesive property to bond the ferrite core to the housing by being applied to a part of the circumference of the ferrite core and a predetermined area of an inner surface of the housing.

4. The communication interface unit of claim 2, wherein the first lead wire and the second lead wire are wound around the ferrite core with a turn ratio of 1:1.

5. A communication interface unit of a facsimile, comprising:
a MODEM unit to modulate data to be transmitted to an external device and demodulate data received from the external device;
a line unit including a silicon data access arrangement to communicate with the external device through a public switched telephone network including an integrated circuit transmitting the modulated data and receiving the data from the external device for demodulation by accessing the public switched telephone network; and
a transformer to transfer the received data from the line unit to the MODEM unit and transferring the modulated data from the MODEM unit to the line unit, the transformer being arranged between the MODEM unit and the line unit, and outside of the MODEM unit and the line unit,
wherein the transformer comprises
a ferrite core having a ring shape, the ring shaped ferrite core having inner and outer circumferential surfaces formed between two end faces;
a housing to house the ferrite core; and
at least one lip extended from a portion of the housing to the ferrite core to fix the ferrite core to the housing, a distal end of the lip terminating on a central portion of at least one of the two end faces of the ferrite core in between the inner and outer circumferential surfaces of the ferrite core,
wherein the housing comprises a housing unit to house the ferrite core,
wherein the housing unit has a trench structure, and
wherein the trench structure houses the ferrite core.

6. The communication interface unit of claim 5, wherein the housing comprises a housing unit to house the ferrite core, and the at least one lip is extended from a portion of the housing unit to a part of a circumference of the ferrite core.

7. The communication interface unit of claim 5, wherein the at least one lip penetrates the ferrite core on the portion of the housing unit and thus is extended to a predetermined area of an inner surface of the ferrite core.

8. The communication interface unit of claim 5, wherein the transformer further comprises a first lead wire and a second lead wire wound around a circumference of the ferrite core in a solenoid shape, and
wherein the housing is configured in such a manner that the first and second lead wires are pulled out from the housing.

9. The communication interface unit of claim 8, wherein the first lead wire and the second lead wire are wound around the ferrite core with a turn ratio of 1:1.

10. A facsimile, comprising:
a communication interface unit;
a scanning unit;
a memory;
a central processing unit; and
a printing unit,
wherein the communication interface unit comprises
a MODEM unit to modulate and demodulate data transmitted/received to/from an external device;
a line unit to communicate with the external device through a public switched telephone network; and
a transformer placed between the MODEM unit and the line unit,
wherein the transformer comprises
a ring-shaped ferrite core;
a housing to housing the ferrite core; and
a bonding member to fix the ferrite core to the housing by bonding a part of a circumference of the ferrite core to the housing,
wherein the housing comprises a housing unit to house the ferrite core,
wherein the housing unit has a trench structure, and
wherein the trench structure houses the ferrite core,
wherein the size of a surface bonding between the ferrite core and the housing is decided according to an allowable capacitance component on the communication interface unit of the facsimile.

11. The communication interface unit of claim 10, wherein the transformer further comprises a first lead wire and a second lead wire wound around a circumference of the ferrite core in a solenoid shape, and
wherein the housing is configured in such a manner that the first and second lead wires are pulled out from the housing.

12. The communication interface unit of claim 10, wherein the bonding member further comprises a resin having an adhesive property to bond the ferrite core to the housing by being applied to a part of the circumference of the ferrite core and a predetermined area of an inner surface of the housing.

13. A facsimile, comprising:
a communication interface unit;
a scanning unit;
a memory;
a central processing unit; and
a printing unit,
wherein the communication interface unit comprises
a MODEM unit to modulate and demodulate data transmitted/received to/from an external device;
a line unit to communicate with the external device through a public switched telephone network; and a transformer placed between the MODEM unit and the line unit,
wherein the transformer comprises
a ring-shaped ferrite core, the ring shaped ferrite core having inner and outer circumferential surfaces formed between two end faces;
a housing to housing the ferrite core; and
at least one lip to fix the ferrite core to the housing, a distal end of the lip terminating on a central portion of at least one of the two end faces of the ferrite core in between the inner and outer circumferential surfaces of the ferrite core,
wherein the housing comprises a housing unit to house the ferrite core,
wherein the housing unit has a trench structure, and
wherein the trench structure houses the ferrite core.

14. The communication interface unit of claim 13, wherein the at least one lip is extended from a portion of the housing unit to a part of a circumference of the ferrite core.

15. The communication interface unit of claim 13, wherein the at least one lip penetrates the ferrite core on the portion of the housing unit and thus is extended to a predetermined area of an inner surface of the ferrite core.

16. The communication interface unit of claim 13, wherein the transformer further comprises a first lead wire and a second lead wire wound around a circumference of the ferrite core in a solenoid shape, and
wherein the housing comprises a housing unit to house the ferrite core, and is configured in such a manner that the first and second lead wires are pulled out from the housing.

* * * * *

UNITED STATES PATENT AND TRADEMARK OFFICE
CERTIFICATE OF CORRECTION

| | | |
|---|---|---|
| PATENT NO. | : 8,035,833 B2 | |
| APPLICATION NO. | : 11/239229 | |
| DATED | : October 11, 2011 | |
| INVENTOR(S) | : Eog-kyu Kim | |

It is certified that error appears in the above-identified patent and that said Letters Patent is hereby corrected as shown below:

Column 8, Line 33, In Claim 10, delete "housing to housing" and insert -- housing to house --, therefor.

Column 9, Line 7, In Claim 13, delete "housing to housing" and insert -- housing to house --, therefor.

Signed and Sealed this
Fourteenth Day of February, 2012

David J. Kappos
*Director of the United States Patent and Trademark Office*